Nov. 1, 1960 M. H. DIEHL ET AL 2,958,825

PULSE DETECTION APPARATUS

Filed June 21, 1954 2 Sheets-Sheet 1

INVENTORS:
MAX H. DIEHL,
HUGH H. MARTIN,

BY Julius J. Zaskalicky
THEIR ATTORNEY.

PULSE DETECTION APPARATUS

Filed June 21, 1954 2 Sheets-Sheet 2

INVENTORS:
MAX H. DIEHL,
HUGH H. MARTIN,
BY Julius J. Zaskalicky
THEIR ATTORNEY.

United States Patent Office 2,958,825

Patented Nov. 1, 1960

2,958,825

PULSE DETECTION APPARATUS

Max H. Diehl, Syracuse, and Hugh H. Martin, North Syracuse, N.Y., assignors to General Electric Company, a corporation of New York Filed June 21, 1954, Ser. No. 438,065

10 Claims. (Cl. 328—111)

This invention relates in general to pulse detection method and apparatus and in particular to pulse detection apparatus for use in television systems.

In present standard color television systems, an oscillation wave of stable phase at the subcarrier frequency is employed at the receiver in demodulating the color information contained in the sidebands of the color subcarrier. Since the subcarrier is not transmitted, this wave must be locally generated at the receiver. To lock the local subcarrier oscillation generator at the proper frequency, pulses of synchronizing signals, commonly called "color bursts," are transmitted following each horizontal synchronizing pulse. Present standards specify that the "color bursts" are not to be transmitted after the equalizing or vertical synchronizing pulses.

Accordingly, a particular object of the present invention is to provide means for inserting "color bursts" in a television synchronizing signal only after horizontal synchronizing pulses.

Another object of this invention is to provide new and improved circuit means for maintaining a burst frequency oscillation generator operative during the interval of transmission of horizontal synchronizing pulses and inoperative during the time interval when equalizing and vertical synchronizing pulses are transmitted.

A still other object of this invention is to provide new and improved means to distinguish between pulses of long and short durations in a train of such pulses.

A further object of this invention is to provide new and improved circuit means for gating a burst frequency oscillation generator only after each horizontal synchronizing pulse.

In carrying out the present invention, in one embodiment thereof there is provided means for differentiating the pulses of a train of pulses of short and long duration to derive pulses corresponding to the leading edges of the pulses of said train. Means are also provided for modifying each of said derived pulses to include a portion occurring in a time interval greater than the duration of the short pulses and less than the duration of the long pulses. Additional means are provided for combining each of said modified pulses with a respective pulse of said train of pulses to derive another pulse when said respective pulse is shorter in duration than said long pulses. As a result pulses are obtained from the combining means only for pulses in said train of pulses shorter in time than said long pulses thereby to detect the pulses of short duration.

The features of the invention desired to be protected are pointed out in the appended claims. The invention itself, however, both as to its organization and method of operation together with further objects and advantages thereof may best be understood by reference to the following description taken in connection with the accompanying drawings in which:

Fig. 1 is a portion of a wave form chart showing the standard synchronizing signals useful in explaining the operation of an embodiment of the invention;

Fig. 2 also shows a wave form useful in explaining the operation of an embodiment of the invention;

Figure 1:
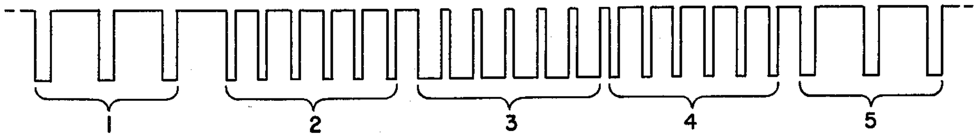

Referring now to Fig. 1, there is shown a graph of a synchronizing signal showing a plurality of horizontal synchronizing pulses 1, followed by six equalizing pulses 2, followed by six vertical synchronizing pulses 3, followed by six more equalizing pulses 4, followed by a plurality of horizontal synchronizing pulses 5.

Figure 2:
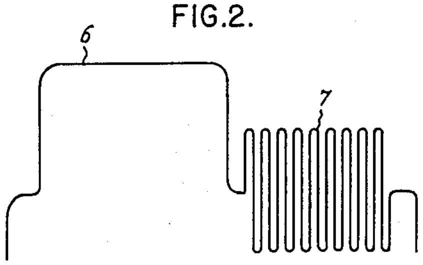

In Fig. 2, there is shown a graph of a wave comprising a single horizontal synchronizing pulse 6 followed by a color burst signal 7 which comprises a nine cycle wave having the frequency of the color subcarrier and which is positioned at the approximate center of the "backporch" or rear portion of the pedestal on which horizontal synchronizing is situated. It will be understood that a similar wave form is generated and transmitted for each horizontal synchronizing pulse.

Figure 3:
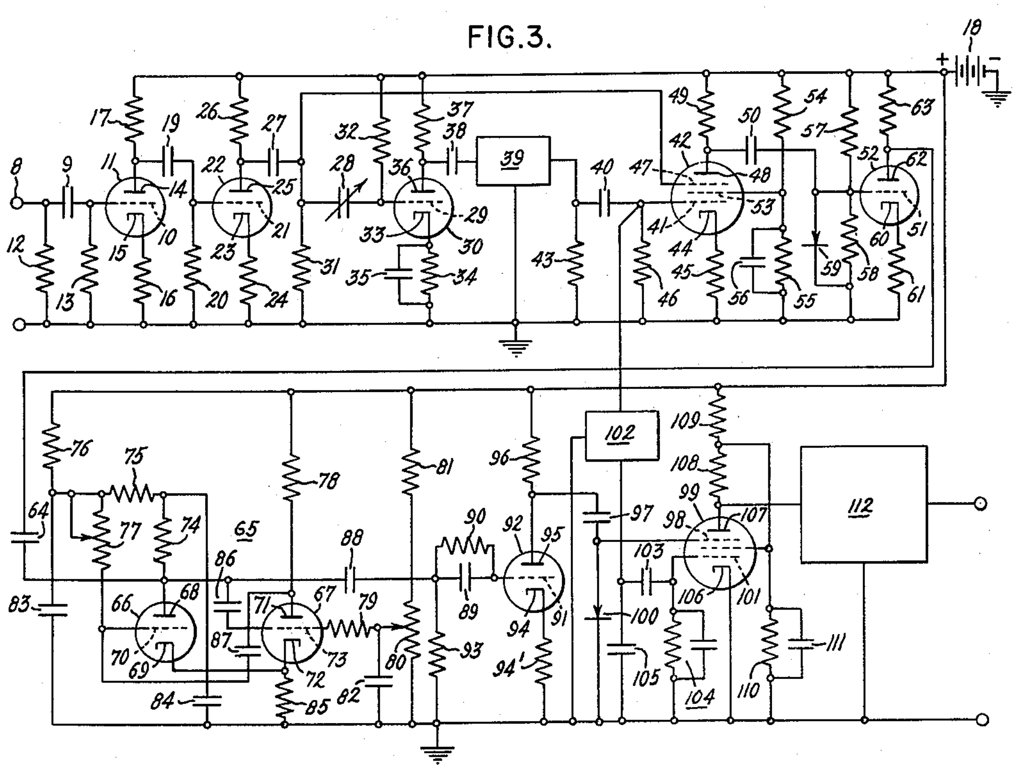
Fig. 3 is a schematic diagram of a preferred embodiment of this invention.

Referring to Fig. 3 there is shown in schematic form an embodiment of the invention designed to be supplied with a synchronizing signal of the kind shown in Fig. 1 and which produces a gating pulse following each horizontal synchronizing pulse, the gating pulse so produced being coincident with the desired location and duration of the color-burst signal.

A signal of the kind shown in Fig. 1 is applied between terminal 8 and ground across resistance 12 and is coupled through a capacitor 9 to the control grid 10 of an electron discharge device 11. A grid leak resistor 13 is connected between control electrode 10 and ground. Discharge device 11 is also provided with an anode 14 and a cathode 15 which is connected to ground through a resistor 16. An anode resistor 17 is connected between anode 14 and the positive terminal of a source of direct voltage 18, the negative terminal of which is connected to ground. The output of device 11 is coupled from anode 14 through a capacitor 19 and across a resistor 20 to control electrode 21 of an electron discharge device 22. Cathode 23 of device 22 is connected to ground through a cathode resistor 24 and an anode 25 of device 22 is connected to source 18 through an anode resistor 26.

The output of device 22 is coupled from anode 25 through the series arrangement of capacitors 27 and 28 to the control electrode 29 of electron discharge device 30. A resistor 31 is connected between the junction of capacitors 27 and 28 to ground. A resistor 32 is connected between control electrode 29 and the positive terminal of source 18. A cathode 33 of device 30 is coupled through the parallel network comprising resistor 34 and capacitor 35 to ground. An anode 36 of device 30 is provided with a positive voltage from source 18 through an anode resistor 37. The output of device 30 is coupled from anode 36 through a capacitor 38 to a delay line 39. The common input and output terminal of delay line 39 is connected to ground. Since delay lines are well known in the art, for purposes of clarity, the line has been represented by a block.

The output of delay line 39 is coupled through a capacitor 40 to a control grid 41 of electron discharge device 42. The output of delay line 39 is taken across a resistor 43 which is connected between the output thereof and ground. The cathode 44 of device 42 is coupled to ground through a resistor 45, and a grid-leak resistor 46 is provided between electrode 41 and ground. The output of device 22 taken at anode 25 is coupled through capacitor 27 to a control electrode 47 of device 42. An anode 48 of device 42 is connected to source 18 through an anode resistor 49. The output of device 42 is taken from anode 48 and coupled through a capacitor 50 to a control electrode 51 of discharge device 52. The screen grid 53 of device 42 is provided with a positive voltage through a resistor 54 connected to source 18. A resistor 55 and a capacitor 56 are connected in parallel between the junction of electrode 53 and resistor 54 and ground. A resistor 57 is connected between source 18 and electrode 51, and a parallel arrangement of a resistor 58 and a unilateral impedance device 59 are connected between electrode 51 and ground. Device 59 is poled so as to conduct electron current from ground to electrode 51. A cathode 60 of device 52 is connected to ground through a cathode resistor 61. An anode 62 of device 52 is connected to source 18 through an anode resistor 63. The output of device 52 is coupled from anode 62 through a capacitor 64 to a one-shot multivibrator circuit generally indicated at 65.

Multivibrator circuit 65 generally comprises a pair of electron discharge devices 66 and 67. Device 66 includes an anode 68, a cathode 69 and a control electrode 70. Electron discharge device 67 includes an anode 71, a cathode 72, and a control electrode 73. Anode 68 is provided with a positive voltage from source 18 through the series arrangement resistors 74, 75, and 76. Control electrode 70 is provided with a positive voltage through a variable resistor 77 connected between electrode 70 and the junction of resistors 75 and 76. Anode 71 of device 67 is provided with positive voltage from source 18 through an anode resistor 78. Control electrode 73 is provided with a positive voltage through a resistor 79, a potentiometer 80, and resistor 81 from source 18. A capacitor 82 is connected between the junction of resistor 79 and potentiometer 80 to ground. A radio frequency bypass capacitor 83 is connected between the junctions of resistors 75 and 76 to ground. A similar capacitor 84 is connected between the junctions of resistors 74 and 75 to ground. A common cathode resistor 85 is connected between ground and cathodes 69 and 72. A capacitor 86 is connected between anode 68 of discharge device 66 and control electrode 73 of discharge device 67, and a capacitor 87 is connected between anode 71 of discharge device 67 and control electrode 70 of discharge device 66.

The output of the multivibrator circuit is taken off at the anode of device 66 and is coupled through a capacitor 88 and the parallel arrangement of a capacitor 89 and a resistor 90 to control electrode 91 of discharge device 92. A resistor 93 is connected between the junction of capacitor 88 and capacitor 89 to ground. A cathode 94 of discharge device 92 is coupled to ground through a cathode resistor 94′, and an anode 95 of discharge device 92 is connected to source 18 through an anode resistor 96. The output of device 92 is taken from anode 95 and coupled through a capacitor 97 to a control electrode 98 of discharge device 99. A unilateral impedance device 100 is connected between electrode 98 and ground and poled so as to conduct electrons from ground to the electrode 98. An electrode 101 of device 99 is provided with a signal from delay line 39 via capacitor 40 through a delay line 102 and a capacitor 103. A bypassed grid-leak arrangement 104 is connected between electrode 101 and ground, and a capacitor 105 is connected between the junction of delay device 102 and capacitor 103 to ground. A cathode 106 of device 99 is directly connected to ground and an anode 107 of device 99 is connected through the series arrangement of resistors 108 and 109 to source 18. The junction of resistors 108 and 109 is connected through the parallel arrangement of a resistor 110 and a capacitor 111 to ground. The output of device 99 is coupled from anode 107 to a multivibrator circuit schematically shown at 112.

Figure 4:
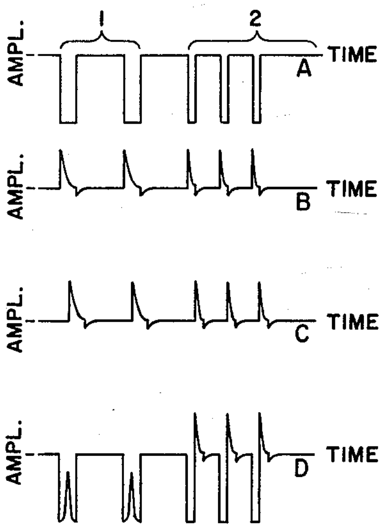
Fig. 4 shows a group of graphs for facilitating an understanding of the embodiment of Fig. 3.

To facilitate an understanding of the operation of the invention as embodied in the circuit of Fig. 3, reference is made to the wave forms illustrated in Fig. 4. In Fig. 4A is illustrated a portion of the waveform of Fig. 1. The portion shown comprises the last two horizontal synchronizing pulses in a frame followed by the first three equalizing pulses. When the waveform of Fig. 1 is supplied to input terminal 8 of Fig. 3, it is amplified and inverted in electron discharge device 11 and further amplified and again inverted in electron discharge device 22. The waveform thus appearing at anode 25 comprises a series of pulses in time phase with the pulses of the input wave but of greater amplitude.

The wave of amplified pulses appearing at anode 25 is then differentiated by the circuit including capacitor 28 and resistor 32 to provide a train of alternate negative and positive spikes coinciding with the leading and trailing edges of the pulses supplied to input terminal 8. The train of spikes is supplied to control electrode 29 of electron discharge device 30 wherein they are amplified and inverted. Reference is made to Fig. 4B wherein is shown the waveform comprising alternate positive and negative spikes which appears at anode 36 of electron discharge device 30. Because of the diode action of grid 29 and cathode 33, the negative spikes are practically non-existent.

The train of spikes from device 30 is delayed slightly longer than the width of an equalizing pulse but less than the width of a horizontal synchronizing pulse in delay device 39 and supplied to the control electrode 41 of electron discharge device 42. Reference is made to Fig. 4C wherein is shown the waveform comprising time delayed spikes which appears at the output of device 39. The train of amplified synchronizing pulses from electron discharge device 22 is coupled to suppressor grid 47 of electron discharge device 42. As previously indicated, the waveform illustrated in Fig. 4A shows the train of synchronizing pulses from electron discharge device 22.

Reference is made to Fig. 4D wherein is shown, superimposed, the waveforms of Fig. 4A and Fig. 4C. The circuit parameters of amplifiers 11, 22, and 30 are chosen such that the amplified synchronizing pulses are of greater amplitude than the spikes. Since the positive spikes appearing at electrode 41 trail the leading edges of the synchronizing pulses by less than the width of a horizontal synchronizing pulse, the positive spikes are superimposed on the horizontal synchronizing pulses. The horizontal synchronizing pulses being negative, render electron discharge device 42 nonconductive and the positive spikes do not appear at anode 48. Should the negative spikes be amplified in device 42, they are bypassed to ground through unilateral impedance device 59.

When an equalizing pulse is supplied to input terminal 8, alternate positive and negative spikes are present at control electrode 41. However, since they have been delayed an amount greater than the width of an equalizing pulse, the positive spike and the corresponding negative equalizing pulse do not appear at electron discharge device 42 simultaneously. As a result, device 42 is not cut-off as in the case of a horizontal pulse, and the positive spike is amplified and coupled to electron discharge device 52 for further amplification. It is, therefore, apparent that a positive spike appears at anode 62 of electron discharge device 52 for each equalizing pulse but not for any of the horizontal pulses.

The output of device 52 which is a positive spike is capacitively coupled to the control electrode of the normally nonconducting electron discharge 67 in multivibrator 65. Multivibrator 65 is conventional and of the type commonly known in the art as a "one-shot" multivibrator. Electron discharge device 66 is normally conducting and electron discharge device 67 is normally nonconducting. When the positive spike-shaped pulse from device 52 is supplied to control electrode 73 of device 67, device 67 becomes conductive and by means well known in the art device 66 becomes nonconductive. Device 66 remains nonconductive for a time interval determined by the adjustment of variable resistor 77. In this particular embodiment of the invention, the length of this interval is important and will be more fully discussed hereinafter.

The positive pulse thus generated in multivibrator 65 in response to the positive spike from device 52 is amplified and inverted in electron discharge device 92 and coupled from the anode thereof to suppressor electrode 98 of electron discharge device 99. The waveform of Fig. 4C which appears at the output of delay device 39 is further delayed in delay device 102 and coupled to the control electrode of device 99. Since device 99 is rendered nonconductive during the duration of the gating pulse from multivibrator 65, the spikes occurring during the period coinciding with the duration of the gating pulse from multivibrator 65 are not amplified. The output of device 99 appearing at anode 107 is coupled to a conventional one-shot multivibrator 112 which generates the gating pulse which controls the occurrence and duration of the color burst signal 7 as shown in Fig. 2.

Thus, only those spikes corresponding to the horizontal synchronizing pulses are supplied to multivibrator 112 as desired since the color burst gating pulse must follow each horizontal synchronizing pulse but not the equalizing or vertical synchronizing pulses. The length of the pulse or gate signal from multivibrator 65 is adjusted to have a time duration equal to the time interval during which the twelve equalizing and six vertical synchronizing pulses are present. Since the multivibrator 65 is triggered by the first equalizing pulse, device 99 is maintained nonconductive during the time when the spikes corresponding to the equalizing and vertical synchronizing pulses appear at control electrode 101. However, the spikes corresponding to the horizontal synchronizing pulses are amplified and used to trigger the burst flag generator 112.

The second delay device 102 is employed to delay the spikes corresponding to the leading edges of the horizontal synchronizing pulses such that the total delay is equal to the desired time interval between the leading edge of the horizontal pulse and the leading edge of the color burst signal. In the absence of this additional delay device, the color burst signals would occur at the approximate center of the horizontal synchronizing pulses rather than in their proper locations on the "back porches" as shown in the waveform of Fig. 2.

Figure 5:
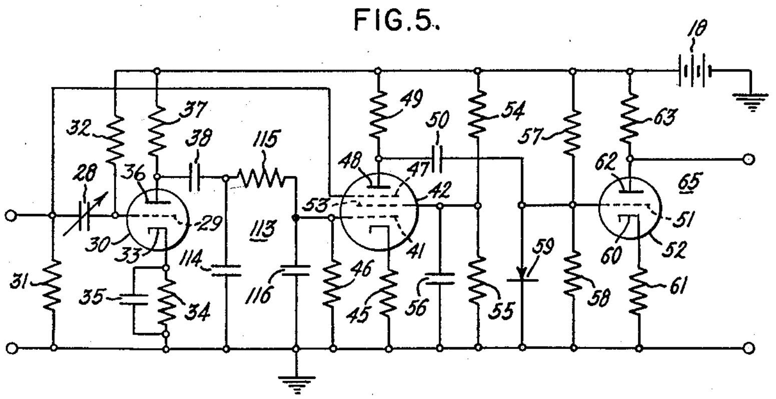
Fig. 5 is a schematic diagram of another embodiment of the present invention.

Referring to Fig. 5 there is illustrated a modification of the embodiment of Fig. 3. Those elements corresponding to similar elements in Fig. 3 have been similarly numbered to simplify an understanding of this modification. In this modification, the time delay device 39 has been replaced with an integrating network 113 comprising a resistor 115, and capacitor 116. Resistor 115 is serially connected between capacitor 38 and control electrode 41 of discharge device 42. Capacitor 114 is connected between the junction of capacitor 38 and a resistor 115 and ground, and capacitor 116 is connected between the junction of resistor 115 and control electrode 41 of discharge device 42 and ground.

Figure 6:
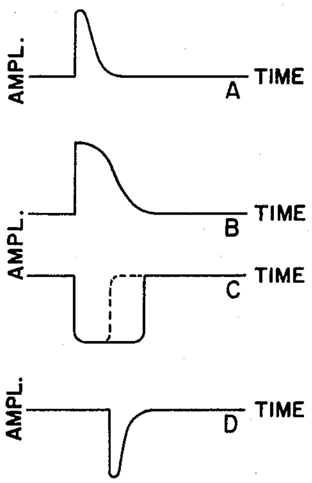
Fig. 6 shows a group of graphs for facilitating an understanding of the embodiment of Fig. 5.

For a better understanding of the operation of this embodiment reference is made to Fig. 6 wherein are shown graphs of waves. Waveform A shows the amplified spike shaped differentiated pulse appearing at anode 36 of device 29. This spike is integrated in integrating circuit 113 such that a signal is provided at control electrode 41 of device 42 which has the shape illustrated in waveform B. The solid line in waveform C represents a horizontal synchronizing pulse and the dotted line represents an equalizing pulse. It will be seen that the horizontal synchronizing pulse has a greater time duration than the pulse of integrated waveform B, while the equalizing pulse has a shorter duration than the pulse of integrated waveform B. Since the negative pulse shown in waveform C is supplied to the suppressor electrode 47 of device 42, this device is rendered nonconductive during each horizontal synchronizing pulse such that there is no output from device 42 and anode 48 corresponding to the horizontal synchronizing pulses as is the case in the embodiment of Fig. 3 during a horizontal synchronizing pulse. The negative equalizing pulse supplied to suppressor electrode 47 does not render device 42 nonconductive during the entire period of the pulse shown in waveform B. Consequently, the latter portion of this integrated waveform as shown in waveform B is amplified in device 42 and provides an output at anode 48 which has the form of a spike as shown in waveform D. The first equalizing pulse supplied to this circuit will produce the spike of waveform D which is amplified in device 52 and triggers multivibrator 65 of Fig. 3. It will be noted that in the embodiment of Fig. 3, a similar spike appeared at anode 48 for each equalizing pulse and the remainder of this embodiment both as to structure and operation is identical with the embodiment illustrated in Fig. 3.

While this invention has been described by means of particular embodiments, it is not limited thereto. In its broader aspects, this invention provides means for detecting pulses of differing widths which is, of course, especially useful in the detecting of equalizing pulses in television synchronizing pulse trains. Therefore, we contemplate by the appended claims to cover any modifications as fall within the true spirit and scope of this invention.

What we claim is new and desire to secure by Letters Patent of the United States is:

1. Apparatus for detecting a given signal which occurs a predetermined period of time after each pulse of long duration in a train of pulses of long and short duration comprising differentiating means for differentiating each of said shorter and longer pulses to produce corresponding differentiated shorter and longer pulses, first modifying means for modifying the time position of each of said differentiated shorter pulses so that each of said modified differentiated shorter pulses is present for a period of time after the termination of the corresponding shorter pulse of said train of pulses, said first modifying means modifying the time position of each of said differentiated longer pulses so that each of said modified differentiated longer pulses terminates before the termination of the corresponding longer pulse of said train of pulses, means responsive to the presence of a modified differentiated pulse after the termination of the corresponding pulse of said train of pulses to produce a control signal, second modifying means for further modifying the time position of said modified differentiated pulses by an amount which when added to the modification time produced by said first modification means gives a total modification time substantially equal to said predetermined period of time, and means responsive to each of said further modified differentiated pulses and the absence of a corresponding control signal to produce an output signal, said output signal corresponding to the occurrence of said given signal.

2. Apparatus for detecting a given signal which occurs a predetermined period of time after each pulse of long duration in a train of pulses of long and short duration comprising differentiating means for differentiating each of said shorter and longer pulses to produce corresponding differentiated shorter and longer pulses, first delay means for delaying each of said differentiated pulses by a delay time greater than the period of each of said shorter pulses and less than the period of each of said longer pulses, means responsive to the presence of a delayed differentiated pulse after the termination of the corresponding pulse of said train of pulses to produce a control signal, second delay means for further delaying said delayed differentiated pulses by a delay time which when added to the delay time of said first delay means gives a total delay time which is substantially equal to said predetermined period of time, and means responsive to each of said further delayed differentiated pulses and the absence of a corresponding control signal to produce an output signal, said output signal corresponding to the occurrence of said given signal.

3. In combination, in a television system carrying a train of synchronizing signals including horizontal synchronizing pulses followed by equalizing pulses, each of a duration shorter than the duration of each of said horizontal synchronizing pulses, pulse width discriminating means responsive to the occurrence of an equalizing pulse for deriving a disabling pulse, control signal means, and means responsive to the termination of said disabling pulse and the next occurring horizontal synchronizing pulse for enabling said control signal means a predetermined period of time after the occurrence of the leading edge of said next occurring horizontal synchronizing pulse.

4. Pulse detection apparatus comprising a source of pulses, differentiating means responsive to pulses from said source of pulses for differentiating the pulses, modifying means responsive to differentiated pulses from said differentiating means for modifying the phase position of the differentiated pulses, and means responsive to unmodified pulses from said source of pulses and responsive to said modified differentiated pulses from said modifying means for producing an output signal only when a modified differentiated pulse is present after the termination of the corresponding unmodified pulse from said source of pulses.

5. The pulse detection apparatus of claim 4 wherein said modifying means is delay means.

6. The pulse detection apparatus of claim wherein said modifying means is integrating means.

7. Apparatus comprising a source of pulses, differentiating means responsive to pulses from said source of pulses for differentiating the pulses, modifying means responsive to differentiated pulses from said differentiating means for modifying the phase position of the differentiated pulses, and means responsive to pulses unmodified in phase position and shape from said source of pulses and responsive to said modified differentiated pulses from said modifying means for producing an output signal.

8. Pulse detection apparatus comprising a source of a train of pulses of long and short duration, differentiating means responsive to the pulses to differentiate the pulses, modifying means to modify the phase position of the differentiated pulses so that a modified differentiated short pulse is present after the termination of the corresponding pulse from said source of pulses and a modified differentiated long pulse is not present after the termination of the corresponding pulse from said source of pulses, and combining means responsive to pulses of a given polarity from said source of pulses and to modified differentiated pulses of a polarity opposite said given polarity from said modifying means to produce an output signal only when a modified differentiated pulse is present after the termination of the corresponding pulse from said source of pulses.

9. The pulse detection apparatus of claim 8 wherein said modifying means is delay means.

10. The pulse detection apparatus of claim 8 wherein said modifying means is integrating means.

References Cited in the file of this patent

UNITED STATES PATENTS

| | | |
|---|---|---|
| 2,484,352 | Miller et al. | Oct. 11, 1949 |
| 2,545,464 | Hoeppner et al. | Mar. 20, 1951 |
| 2,564,824 | White | Aug. 21, 1951 |
| 2,568,750 | Krause | Sept. 25, 1951 |
| 2,634,346 | Hoeppner | Apr. 7, 1953 |
| 2,648,766 | Eberhard | Aug. 11, 1953 |
| 2,653,187 | Luck et al. | Sept. 22, 1953 |
| 2,654,028 | Levy | Sept. 29, 1953 |
| 2,668,236 | McCoy | Feb. 2, 1954 |
| 2,677,763 | Sunstein | May 4, 1954 |
| 2,706,810 | Jacobsen | Apr. 19, 1955 |